(No Model.)
J. L. BERRY & S. GLADNEY.
FAUCET.
No. 269,912. Patented Jan. 2, 1883.
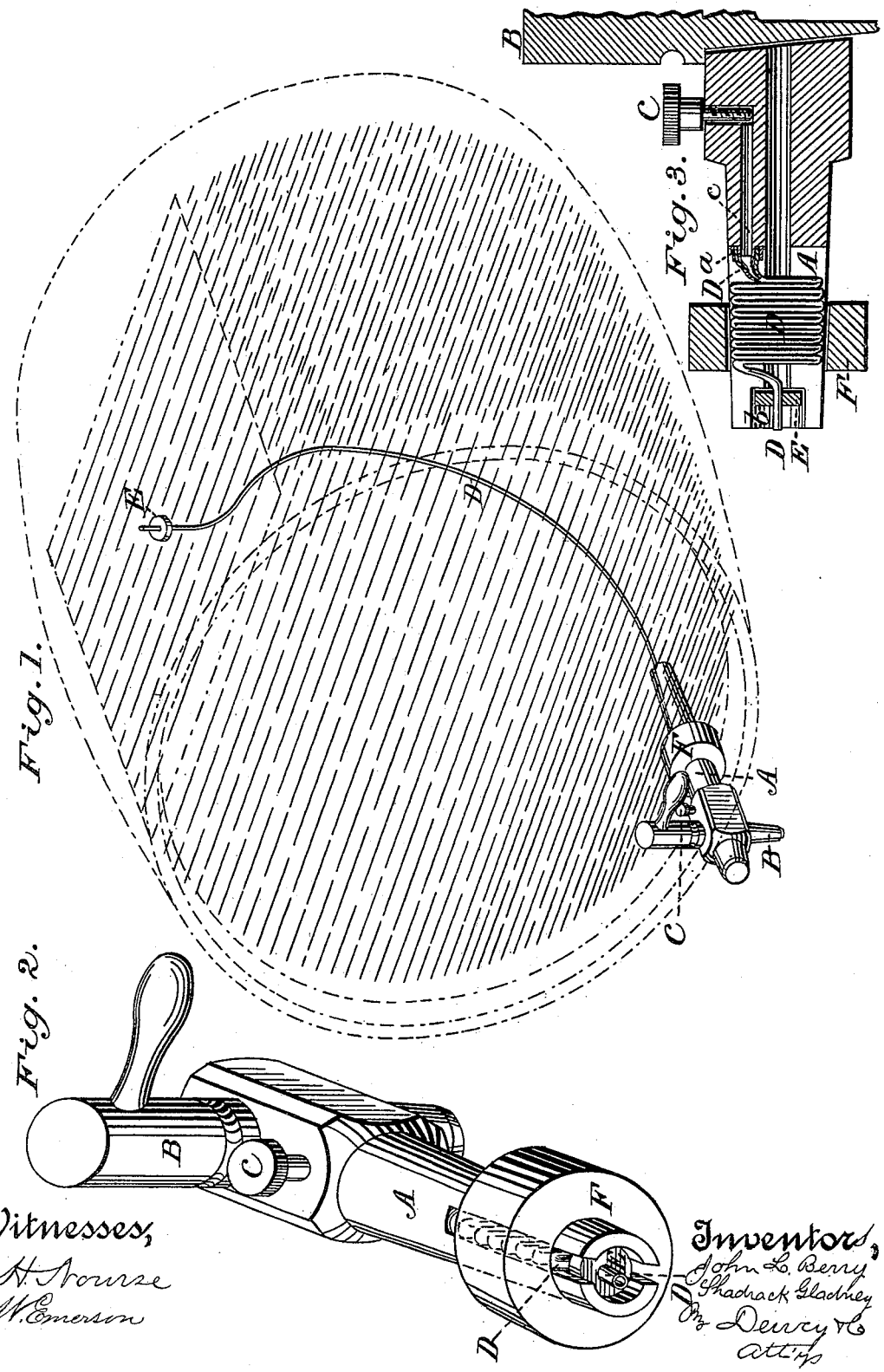

UNITED STATES PATENT OFFICE.

JOHN L. BERRY AND SHADRACK GLADNEY, OF ANTELOPE, CALIFORNIA.

FAUCET.

SPECIFICATION forming part of Letters Patent No. 269,912, dated January 2, 1883.

Application filed July 20, 1882. (No model.)

*To all whom it may concern:*

Be it known that we, JOHN L. BERRY and SHADRACK GLADNEY, of Antelope, county of Sacramento, State of California, have invented an Improved Faucet; and we hereby declare the following to be a full, clear, and exact description thereof.

Our invention relates to a new and useful improvement in faucets; and it consists in certain details of construction, hereinafter fully described, and specifically pointed out in the claim.

Referring to the accompanying drawings, Figure 1 is a perspective showing faucet inserted in keg and air-tube floating on liquid. Fig. 2 is a perspective of faucet. Fig. 3 is a longitudinal section of same.

Let A represent a pipe of an ordinary faucet, furnished with a spigot, B, provided with the usual port, which when in line with the aperture in the pipe opens the faucet and when turned away closes it. The rear end of the faucet-pipe A is slotted, as shown, and is provided with an open socket, *b*. In the base or inner wall of the slot, above the pipe-aperture, is made a hole or passage, *c*, extending forward in the pipe to a point just behind the spigot, where it turns upward at right angles and opens out on top of the pipe. This passage is entirely separate from the main or liquid passage of the faucet. The outer end is provided with a thumb-screw, C, which regulates the escape of the gas and vapor, which pass through the passage *c*. The rear or inner end of this passage is provided with a small nipple, *a*, which receives a flexible tube or pipe, D, secured thereon by fine wire or otherwise, which will render it easy to be removed for the substitution of another. The tube D must be long enough to extend from the faucet to the highest level of the beer. Near its end it is provided with a float, E, small enough to fit within socket *b* in the end of the faucet, but of sufficient buoyancy to carry the tube to the surface of the liquid. Around the rear or small end of the faucet-pipe A is fitted a heavy rubber ring, F.

The use of our faucet is as follows: When about to be tapped into the keg, in order to prevent the flexible tube from being injured, it is bent up and confined within the slotted end of the pipe A. The float fits somewhat loosely within the socket *b*, and the rubber ring F is drawn down around the slotted end and holds the tube therein, preventing it from forcing the float out of place. When the faucet is forced in the tube and float are uninjured, and the rubber ring is pushed back, thus releasing the tube from its slot, and the float is forced out both by the tube and the liquid. It rises with the end of the tube to the surface of the liquid and sustains the open end above the liquid.

Another object and advantage of the rubber ring F is that it forms a packing about the front of the aperture and prevents the liquid from squirting out when the barrel is tapped.

When we wish to draw some beer we open the faucet in the usual manner, and at the same time turn the thumb-screw C to open the passage *c*. The gas and vapor escape through this passage, being conducted to it by the tube D, which, as we have explained, has its inner end above the surface of the liquid.

We can through this faucet draw beer into small as well as large vessels. It is useful also in admitting air to those casks or barrels from which liquid will not readily flow.

Having thus described our invention, what we claim as new, and desire to secure by Letters Patent, is—

A spigot provided with slotted pipe A and a supplemental opening, and a tube and float adapted to communicate with the interior of the vessel above the liquid, in combination with the elastic retaining-band F to hold the tube and float within the slotted pipe A, as set forth.

In witness whereof we hereunto set our hands.

JOHN L. BERRY.
SHADRACK GLADNEY.

Witnesses:
A. E. FULLER,
WM. SAWTELL.